(12) United States Patent
Roberts

(10) Patent No.: US 12,308,491 B2
(45) Date of Patent: May 20, 2025

(54) INTEGRATED SOLID OXIDE FUEL CELL COMBUSTOR ASSEMBLY, SYSTEM, AND METHOD THEREOF

(71) Applicant: Tennessee Technological University, Cookeville, TN (US)

(72) Inventor: Rory Roberts, Cookeville, TN (US)

(73) Assignee: TENNESSEE TECHNOLOGICAL UNIVERSITY, Cookeville, TN (US)

(*) Notice: Subject to any disclaimer, the term of this patent is extended or adjusted under 35 U.S.C. 154(b) by 0 days.

(21) Appl. No.: 18/743,930

(22) Filed: Jun. 14, 2024

(65) Prior Publication Data

US 2024/0429413 A1 Dec. 26, 2024

Related U.S. Application Data

(60) Provisional application No. 63/523,365, filed on Jun. 26, 2023, provisional application No. 63/528,350, (Continued)

(51) Int. Cl.
*H01M 8/04223* (2016.01)
*B60L 58/33* (2019.01)
(Continued)

(52) U.S. Cl.
CPC ......... *H01M 8/04268* (2013.01); *B60L 58/33* (2019.02); *H01M 8/04022* (2013.01); (Continued)

(58) Field of Classification Search
CPC ......... H01M 8/04268; H01M 8/04022; H01M 8/04097; H01M 8/12; H01M 2008/1293; H01M 2250/20; B60L 58/33
(Continued)

(56) References Cited

U.S. PATENT DOCUMENTS 6,017,646 A * 1/2000 Prasad ...................... C01B 3/36
429/495
6,461,751 B1 10/2002 Boehm et al.
(Continued)

FOREIGN PATENT DOCUMENTS

CN 104948303 A 9/2015
CN 106968793 A 7/2017
(Continued)

OTHER PUBLICATIONS

R. R. Sinnamon, "Analysis of a Fuel Cell Combustor in a Solid Oxide Fuel Cell Hybrid Gas Turbine Power System for Aerospace Application," Wright State University, 2014.
(Continued)

*Primary Examiner* — Christian Roldan
(74) *Attorney, Agent, or Firm* — André J. Bahou; Alex Huffstutter; Bradley Arant Boult Cummings LLP

(57) ABSTRACT

The solid oxide fuel cell with combustor (SOFC-C) addresses the problems of fast start-up, high gravimetric power density and emission control facing SOFC in aerospace and other mobile vehicle applications by providing a highly efficient clean power generation for full or partial hybrid propulsion systems. The SOFC-C may include one or more SOFC tubes and a combustion chamber integrated within a housing. Fuel may be provided through an anode portion of the one or more SOFC tubes or stacks and be combusted upon exiting the one or more SOFC tubes or stacks. The combustion products may then be provided through a cathode portion of the one or more SOFC tubes or stacks, whereby pollutants may be reduced or removed from the combustion products by the cathode portion prior exiting the housing as exhaust. A cathode inlet temperature may be controlled by controlling the fuel flow.

19 Claims, 5 Drawing Sheets

Related U.S. Application Data filed on Jul. 22, 2023, provisional application No. 63/528,358, filed on Jul. 22, 2023.

(51) Int. Cl.
*H01M 8/04014* (2016.01)
*H01M 8/04089* (2016.01)
*H01M 8/12* (2016.01)

(52) U.S. Cl.
CPC ......... *H01M 8/04097* (2013.01); *H01M 8/12* (2013.01); *H01M 2008/1293* (2013.01); *H01M 2250/20* (2013.01)

(58) Field of Classification Search
USPC ........................................................ 429/415
See application file for complete search history.

(56) References Cited

U.S. PATENT DOCUMENTS

| | | | |
|---|---|---|---|
| 6,689,499 | B2 | 2/2004 | Gillett et al. |
| 7,260,926 | B2 | 8/2007 | Sabatino et al. |
| 7,547,484 | B2 | 6/2009 | Crumm et al. |
| 8,304,136 | B2 | 11/2012 | Lee et al. |
| 8,389,180 | B2 | 3/2013 | Hawkes et al. |
| 8,511,613 | B2 | 8/2013 | Droney |
| 9,118,054 | B2 | 8/2015 | Gummalla et al. |
| 9,178,228 | B2 | 11/2015 | Heddrich et al. |
| 9,242,728 | B2 | 1/2016 | Morrison |
| 9,493,246 | B2 | 11/2016 | Barmichev et al. |
| 9,764,822 | B2 | 9/2017 | Morrison |
| 9,937,803 | B2 | 4/2018 | Siegel et al. |
| 10,202,699 | B2 | 2/2019 | Otto |
| 10,224,556 | B2 | 3/2019 | Lents et al. |
| 10,644,331 | B2 | 5/2020 | Stoia et al. |
| 11,001,384 | B2 | 5/2021 | Schank |
| 11,001,389 | B2 | 5/2021 | Hinderliter |
| 11,148,819 | B2 | 10/2021 | Demont et al. |
| 2001/0036566 | A1 | 11/2001 | Dekker et al. |
| 2002/0092287 | A1* | 7/2002 | Logvinov ......... H01M 8/04097 60/39.6 |
| 2004/0250871 | A1 | 12/2004 | Bingham et al. |
| 2005/0106429 | A1* | 5/2005 | Keefer ................ H01M 8/0625 429/444 |
| 2005/0112452 | A1* | 5/2005 | Crumm ............... H01M 8/1231 429/495 |
| 2006/0138278 | A1 | 6/2006 | Gans |
| 2007/0158500 | A1 | 7/2007 | Sridhar et al. |
| 2008/0070078 | A1 | 3/2008 | Gummalla et al. |
| 2009/0293494 | A1 | 12/2009 | Hoffjann et al. |
| 2009/0309364 | A1 | 12/2009 | Marconi |
| 2010/0203417 | A1 | 8/2010 | Venkataraman et al. |
| 2013/0186059 | A1 | 7/2013 | Epstein et al. |
| 2014/0216036 | A1 | 8/2014 | Bozzolo et al. |
| 2014/0339371 | A1 | 11/2014 | Yates et al. |
| 2015/0330575 | A1 | 11/2015 | Epstein et al. |
| 2016/0064760 | A1 | 3/2016 | Akagi et al. |
| 2017/0233111 | A1 | 8/2017 | Mata et al. |
| 2017/0288246 | A1 | 10/2017 | Mizuno et al. |
| 2018/0304753 | A1 | 10/2018 | Vondrell et al. |
| 2019/0136761 | A1 | 5/2019 | Shapiro et al. |
| 2020/0055610 | A1 | 2/2020 | Terwilliger et al. |
| 2020/0262573 | A1 | 8/2020 | Moldenhauer |
| 2020/0391876 | A1 | 12/2020 | Morrison |
| 2021/0031934 | A1 | 2/2021 | Becker et al. |
| 2021/0075041 | A1* | 3/2021 | Irie ................... H01M 8/04328 |
| 2021/0098805 | A1 | 4/2021 | Poirier et al. |
| 2021/0107674 | A1 | 4/2021 | Haberbusch et al. |
| 2021/0332759 | A1 | 10/2021 | Smith et al. |
| 2022/0021010 | A1 | 1/2022 | Bang et al. |
| 2022/0069605 | A1 | 3/2022 | Trela et al. |
| 2022/0238895 | A1 | 7/2022 | Piesker et al. |

FOREIGN PATENT DOCUMENTS

| | | |
|---|---|---|
| CN | 110056429 A | 7/2019 |
| EP | 2 644 508 A1 | 3/2015 |
| EP | 3 480 114 A1 | 5/2019 |
| EP | 3 718 897 A1 | 10/2020 |
| EP | 3 866 235 A1 | 8/2021 |
| WO | WO 02/067354 A2 | 8/2002 |
| WO | WO 2004/066467 A2 | 8/2004 |
| WO | WO 2011/092297 A2 | 8/2011 |
| WO | WO 2013/020997 A1 | 2/2013 |
| WO | WO 2014/105325 A1 | 7/2014 |
| WO | WO 2014/209454 A1 | 12/2014 |
| WO | WO 2018/087213 A1 | 5/2018 |
| WO | WO 2022/127977 A1 | 6/2022 |

OTHER PUBLICATIONS

M. R. Withers et al., "Economic and environmental assessment of liquefied natural gas as a supplemental aircraft fuel," *Prog. Aerosp. Sci.*, vol. 66, pp. 17-36, Apr. 2014, doi: 10.1016/j.paerosci.2013. 12.002.

R. A. Roberts, S. R. Nuzum, and M. Wolff, "Liquefied natural gas as the next aviation fuel," 2015, doi: 10.2514/6.2015-4247.

R. T. Kawai, "Benefit Potential for a Cost Efficient Dual Fuel BWB," pp. 1-14.

V. A. Chakravarthula, "Transient Analysis of a Solid Oxide Fuel Cell/ Gas Turbine Hybrid System for Distributed Electric Propulsion," Wright State University, Wright State University, 2016.

J. Xu and G. F. Froment, "Methane steam reforming, methanation and water-gas shift: I. Intrinsic kinetics," *AIChE J.*, vol. 35, No. 1, pp. 88-96, Jan. 1989, doi: https://doi.org/10.1002/aic.690350109.

P. Kumar and A. Khalid, "Blended wing body propulsion system design," *Int. J. Aviat. Aeronaut. Aerosp.*, vol. 4, No. 4, pp. 1-43, 2017, doi: 10.15394/ijaaa.2017.1187.

V. Karnozov, "Aviadvigatel Mulls Higher-thrust PD-14s To Replace PS-90A," 2019 https://www.ainonline.com/aviation-news/air-transport/2019-08-19/aviadvigatel-mulls-higher-thrust-pd-14s-replace-ps-90a (accessed Jan. 4, 2022).

A. Leonide, V. Sonn, A. Weber and E. Ivers-Tiffée, "Evaluation and Modeling of the Cell Resistance in Anode-Supported Solid Oxide Fuel Cell" J. Electrochem. Soc. 2008 155, B36-B41, doi:10.1149/1.2801372.

S. Primdahl, M.B. Mogensen, "Gas Conversion Impedance: A Test Geometry Effect in Characterization of Solid Oxide Fuel Cell Anodes" J. Electrochem. Soc. 1998 155, B36-B41, doi: 10.1149/1.1838654.

T. Ohrn, Z. Liu, Z. Xing, R. Goettler, "Parametric Electrochemical Impedance Spectroscopy Analysis on High Pressure In Plane SOFC" ECS Transactions, vol. 45 No. 1, pp. 441-452, 2012, doi:10.1149/1.3701335.

Y. Fu, Y. Jiang, S. Poizeau, A. Dutta, A. Mohanram, J. D. Pietras, and M. Z. Bazant. "Multicomponent Gas Diffusion in Porous Electrodes." J. Electrochem. Soc 162, No. 6 pp. F613-F621, Mar. 2, 2015, http://dx.doi.org/10.1149/2.0911506jes.

J. Railsback, G. Hughes, L. Mogni, A. M. Hernandez, S. A. Barnett. "High-Pressure Performance of Mixed-Conducting Oxygen Electrodes: Effect of Interstitial versus Vacancy Conductivity" J. Electrochem. Soc.163, No. 13 pp. F1433-F1439, 2016, doi: 10.1149/2.1071613jes.

L. Chick, O. Marina, C. Coyle, E. Thomsen, "Effects of temperature and pressure on the performance of a solid oxide fuel cell running on steam reformate of kerosene" Journal of Power Sources, 236, pp. 341-349, 2013, http://dx.doi.org/10.1016/j.jpowsour.2012.11.136.

G. DiGiuseppe, V. Boddapati, "Characterization of Solid Oxide Fuel Cells with LSCF-SDC Composite Cathodes", Journal of Energy, vol. 2018, Article ID 4041960, 2018, https://doi.org/10.1155/2018/4041960.

Manufacturing Cost Analysis of 1, 5, 10 and 25kW Fuel Cell Systems for Primary Power and Combined Heat and Power Applications. Report to US DoE from Battelle Memorial institute, 2017.

V. A. Chakravarthula and R. A. Roberts, "Transient analysis of an innovative cycle integrating a SOFC and a turbogenerator for

(56) References Cited

OTHER PUBLICATIONS electric propulsion," in *Proceedings of the ASME Turbo Expo*, 2017, vol. 3, doi: 10.1115/GT2017-64804.

J. Mýrdal, P. Hendriksen, R. Graves, S. Jensen, & R. Nielsen, Predicting the price of solid oxide electrolysers (SOECs). Project Report, Technical University of Denmark, 2016.

C.Y. Chan, Development and Techno-Economic Analysis of SOFC-GT Hybrid Systems Employing Renewable Hydrogen for Stationary Applications and LNG for Mobile Applications. Master Thesis, University of California Irvine, 2020.

F. Rosner, D. Yang, A. Rao, and S. Samuelsen, "Gas Turbine Price Projection for n-th Plant Equipment Cost," Eng. Econ. DOI: 10.1080/0013791X.2022.2048330, 2022.

United States Natural Gas Industrial Prices, U.S. Energy Information Administration, https://www.eia.gov/dnav/ng/hist/n3035us3m.htm . Jan. 29, 2023.

Krich, Ken, Don Augenstein, J. P. Batmale, John Benemann, Brad Rutledge, and Dara Salour. "Biomethane from dairy waste." A Sourcebook for the Production and Use of Renewable Natural Gas in California Chapter 8, (2005): 147-162.

Smajla, Ivan, Daria Karasalihović Sedlar, Branko Drljača, and Lucija Jukić. "Fuel switch to LNG in heavy truck traffic." Energies 12, (3)(2019): 515.

Facts about Boeing 737-800. https://epicflightacademy.com/boeing-737-800.

Van Biert, Lindert, M. Godjevac, K. Visser, and P. V. Aravind. "A review of fuel cell systems for maritime applications." Journal of Power Sources 327 (2016): 345-364.

Michael Ratner, U.S. Natural Gas: Becoming Dominant, Congressional Research Service, https://sgp.fas.org/crs/misc/R45988.pdf (2019).

Sapra, Harsh, Jelle Stam, Jeroen Reurings, Lindert van Biert, Wim van Sluijs, Peter de Vos, Klaas Visser, Aravind Purushothaman Vellayani, and Hans Hopman. "Integration of solid oxide fuel cell and internal combustion engine for maritime applications." Applied Energy, 281 (2021): 115854.

Lu, Zigui, Shadi Darvish, John Hardy, Jared Templeton, Jeffry Stevenson, and Yu Zhong. "SrZrO3 formation at the interlayer/electrolyte interface during (La1-xSrx) 1-δCo1-yFeyO3 cathode sintering." Journal of The Electrochemical Society 164, (10) (2017): F3097.

Chick, Larry A., L. R. Pederson, G. D. Maupin, J. L. Bates, L. E. Thomas, and G. J. Exarhos. "Glycine-nitrate combustion synthesis of oxide ceramic powders." Materials letters 10, (1-2) (1990): 6-12.

Xueliang Jiang, Jiao Zhang, Lu Yu, Ruiqi Chen, Xiong Xu, Micro & Nano Letters, 11(3), (2016): 137-141.

Yanxia Li, Chaoming Luo, Zhongliang Liu, and Lixia Sang. "Catalytic oxidation characteristics of CH4-air mixtures over metal foam monoliths." Applied Energy 156 (2015): 756-761.

Namgung Y, Hong J, Kumar A, Lim DK, Song SJ. One step infiltration induced multi-cation oxide nanocatalyst for load proof SOFC application. Applied Catalysis B: Environmental. 267(2020): 118374.

Roberts, R. A., J. Brouwer, et al. "Fuel Cell/Gas Turbine Hybrid System Control for Daily Load Profile and Ambient Condition Variation." Journal of Engineering for Gas Turbines and Power, 132, 21-27, (2010).

Roberts, R. A., Eastbourn, S., "Computational Efficient Dynamic Turbofan Engine Model for a Multidisciplinary Vehicle-Level Modeling and Simulation Tool." International Journal of Aerospace Engineering, 2014, (2014).

Roberts, R. A. and J. Brouwer. "Dynamic Simulation of a Pressurized 220 KW Solid Oxide Fuel Cell-Gas Turbine Hybrid System: Modeled Performance Compared to Measured Results." Journal of Fuel Cell Science and Technology. 3, 18 (2006).

Foelber, D. The continued rise of LNG. *Gas Compression* (2019).

Noord, J. Van. A Heat Transfer Investigation of Liquid and Two-Phase Methane. (2010).

Weber, R. J. *Liquified natural gas as a fuel for supersonic aircraft.* https://ntrs.nasa.gov/search.jsp?R=19670048710 (1967).

Segal, C. *The Scramjet Engine Processes and Characteristics. Cambridge University Press* (Cambridge University Press, 2011).

Heppenheimer, T. A. *Facing the Heat Barrier: A History of Hypersonics.* (NASA, 2006).

Lander, H. & Nixon, A. C. Endothermic fuels for hypersonic vehicles. *J. Aircr.* 8, 200-207 (1968).

Smart, M. K. Comparison between hydrogen and methane fuels in a 3-D scramjet at Mach 8. (2016).

Albegov, R. V, Vinogradov, V. A. & Shikhman, Y. M. Combustion of methane injected into an air flow with high subsonic velocities by different methods. *Combust. Explos. Shock Waves* 52, 14-25 (2016).

Ladeinde, F. & Li, W. Differential Turbulent Supersonic Combustion of Hydrogen, Methane, and Ethylene, Without Assisted Ignition. *AIAA J.* 56, 4870-4883 (2018).

Nakaya, S., Kinoshita, R., Lee, J., Ishikawa, H. & Tsue, M. Analysis of supersonic combustion characteristics of ethylene/methane fuel mixture on high-speed measurements of CH* chemiluminescence. *Proc. Combust. Inst.* 37, 3749-3756 (2019).

Slefarski, R. Study on the combustion process of premixed methane flames with $CO_2$ dilution at elevated pressures. *Energies* 12, (2019).

Song, J., Choi, M., Kim, D. & Park, S. Combustion Characteristics of Methane Direct Injection Engine Under Various Injection Timings and Injection Pressures. *J. Eng. Gas Turbines Power* 139, (2017).

Urzay, J. Supersonic Combustion in Air-Breathing Propulsion Systems for Hypersonic Flight. *Annu. Rev. Fluid Mech.* 50, 593-627 (2018).

Chalker, J. Design and Manipulation of a Power-Generating System With High-Temperature Fuel Cells for Hypersonic Applications. *Wright State University* (Wright State University, 2019).

Kasen, S. D. Thermal Management at Hypersonic Leading Edges. *PhD* 316 (2013).

Detonation Engine Research Facility (DERF). https://www.afrl.af.mil/Portals/90/Documents/RQ/rq-detonation-engine-research-DERF-2018.pdf?ver=2020-08-28-132030-800 (2023).

AFIT Combustion Optimization and Analysis Laser (COAL) Laboratory. https://www.afit.edu/eny/news.cfm?article=0563 (2023).

Sub-scale Direct Connect Supersonic Combustion Facility. *AFRL* (2023).

Roberts, R. A. Propulsion, Power, and Thermal Systems Laboratory (PPATS). *Tennessee Tech University* https://sites.tntech.edu/ppats (2023).

Butt, N., Roberts, R. A., Patnaik, S., "Transient Temperature Effects on the Optical Power Wavelength Shift of a High-Power Laser System", Applied Thermal Engineering, 156, 531-540, (2019).

Roberts, R. A., Doty, J., "Implementation of a Transient Exergy Analysis for a Plate Fin Heat Exchanger." International Journal of Exergy, 16, 109-126, (2015).

Roberts, R. A., Eastbourn, S., "Vehicle-Level Tip-to-Tail Modeling of an Aircraft." International Journal of Thermodynamics, 17, 107-115 (2014).

Roberts, R. A., Decker, D. D. "Control Architecture Study Focused on Energy Savings of an Aircraft Thermal Management System." Journal of Dynamic Systems, Measurement and Control, 136, 41003, (2014).

Butt, N., Roberts, R. A., Patnaik, S., "Laser Diode Optical Output Dependence on Junction Temperature for High-Power Laser Systems", Optics and Laser Technology, 125, 106019, (2020).

Turner, M.G. , Roberts, R.A., et al., "Thrust Vectoring Design Project at Six Universities " International Journal of Engineering Education, 32, 1 (A) 252-271 (2016).

Allison, D. L., Shimmin, K., Schley, W., and Bryson, D., "Automated 6DOF Model Generation and Actuator Sizing within AFSIM." SAE AeroTech Americas, 2019-01-1336, (2019).

Allison, D. L., Boyd, M., and McCarthy, K., "Transients in Early Aircraft Multidisciplinary Design." AIAA SciTech, AIAA-2018-0656, Jan. 2018.

Ryan I. Druss, Marc D. Polanka, Timothy Ombrello and Frederick Schauer, "Scramjet Operability and RDE Design for RDE Piloted Scramjet," AIAA 2019-0199.

Timothy Ombrello, Campbell Carter, Jonathan McCall, Fred Schauer, Chung-jen Tam, Andrew Naples, John Hoke, Kuangyu Hus, "Pulsed

(56) References Cited

OTHER PUBLICATIONS

Detonation Combustor in a Supersonic Cross-Flow for Enhanced Mixing and Ignition," AIAA-2011-3713.

T. Helfrich, F. Schauer, R. Bradley, and J. Hoke, "Evaluation of Catalytic and Thermal Cracking in a JP-8 Fueled Pulsed Detonation Engine", AIAA-2007-235.

Kaitlin Moosmann, Nicholas D. Grannan, John Hoke and Frederick Schauer, "Recuperator Integration with Small Turbine Engine," AIAA 2019-1946.

T. Helfrich, F. Schauer, R. Bradley, and J. Hoke, "Ignition and Detonation-Initiation Characteristics of Hydrogen and Hydrocarbon Fuels in a PDE", AIAA-2007-234.

C. Tucker, P. King, and F. Schauer, "A Hydrocarbon Fuel Flash Vaporization System for a Pulsed Detonation Engine," Journal of Propulsion and Power, vol. 24, No. 4 (2008).

E. Nagley, P. King, F. Schauer, M. DeWitt, and J. Hoke, "Fuel Composition Analysis of Endothermically Heated JP-8 Fuel for Use in a Pulsed Detonation Engine", AIAA-2008-109.

S. Theuerkauf, P. King, F. Schauer, & J. Hoke, "Thermal Management for a Modular Rotating Detonation Engine," AIAA 2013-1176.

Christen Miser, Paul King and Frederick Schauer, "PDE Flash Vaporization System for Hydrocarbon Fuel Using Thrust Tube Waste Heat," AIAA 2005-3511.

"Boeing 373 Max 10," 2022. https://www.boeing.com/commercial/737max10/index.page (accessed Oct. 3, 2022).

Allison, D. L., Kolonay, R., "Expanded MDO for Effectiveness Based Design Technologies: Expedite Program Introduction." AIAA Aviation Conference, AIAA-2018-3419, (2018).

Allison, D. L., Integrated Propulsion, Power and Thermal Early During Air Vehicle Conceptual Design: NATO STO AVT-333 Activity Update. More Electric Aircraft Conference, Sep. 2019.

Sellers, P. S., Carrere, A., and Allison, D. L., "Results, Conclusions, and Lessons Learned from the OPTimized Integrated MUltidisciplinary Systems (OPTIMUS) Program." AIAA Aviation Conference, Distribution C, AIAA-2019-3101, (2019).

Bane, S., Allison, D. L., "Coupled Fluid-Thermal-Structural Interaction for the Design of Hypersonic Systems", Systems Engineering and Architecture Technology Network Symposium, 2020-SEA-00047, (2020).

Allison, D. L., Wood, A., Khan, J., and Dunn, A., "Raytheon Development of High-Fidelity Fluid-Structural-Thermal Interaction (FSTI) Workflows." NASA Fluid-Thermal-Structural Interaction Workshop, (2023).

Allison, D. L., "Optimus Program Overview: Accounting for Power and Thermal Effects Early in the Aircraft Design Process." $4^{th}$ International More Electric Aircraft Conference, Oct. 2016.

Allison, D. L., "Thermal Considerations in More Electric and Fully Electric Air Vehicles", $3^{rd}$ More Electric Aircraft Conference USA, Aug. 2018.

Carrere, A., Sellers, P. S., and Allison, D. L., "Building an Expanded MDAO Process with Subsystem Analysis for Next Generation Air Dominance Platforms." AIAA Aviation Conference, Distribution C, AIAA-2019-3100, (2019).

F. Schauer et al., "DARPA Vulcan Risk Reduction Report (Combustion of Coal-Syngas in a high speed propulsion system),"., JANNAF Propulsion Meeting, 2013.

Hill, P. & Peterson, C. *Mechanics and Thermodynamics of Propulsion: Solutions Manual*. Table of Contents (pp. 1-12) & Chapter 10 (pp. 482-525) (Pearson Higher Education & Professional Group, 1994).

International Search Report and Written Opinion mailed Dec. 17, 2024 in correspondence PCT Application No. PCT/US24/34091, in 18 pgs.

\* cited by examiner

INTEGRATED SOLID OXIDE FUEL CELL COMBUSTOR ASSEMBLY, SYSTEM, AND METHOD THEREOF

CROSS-REFERENCES TO RELATED APPLICATIONS

This is a non-provisional patent application claiming priority to U.S. Provisional Patent Application Ser. No. 63/523,358 filed Jun. 26, 2023, and entitled "Integrated Solid Oxide Fuel Cell Combustor Assembly, System, and Method Thereof", U.S. Provisional Patent Application Ser. No. 63/523,365 filed Jun. 26, 2023, and entitled "Integrated Solid Oxide Fuel Cell Combustor Assembly, System, and Method Thereof", and U.S. Provisional Patent Application Ser. No. 63/528,350 filed Jul. 22, 2023, and entitled "Integrated Solid Oxide Fuel Cell Combustor Assembly, System, and Method Thereof", each of which is incorporated in its entirety.

STATEMENT REGARDING FEDERALLY SPONSORED RESEARCH OR DEVELOPMENT

The subject matter herein was funded in part by Department of Energy, ARPA-E Research Program Grant No. DE-AR0001348.

This Non-Provisional patent application is filed by Applicant and Assignee Tennessee Technological University in Cookeville, Tennessee. The inventor is Rory Roberts, a permanent resident of the United States residing in Cookeville, Tennessee, for the invention entitled "Integrated Solid Oxide Fuel Cell Combustor Assembly, System, and Method Thereof."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present invention relates generally to fuel cell power systems and various high temperature fuel cell systems.

More particularly, this invention pertains to fuel cell power systems with fast start-up, thermal and emission control, including solid oxide fuel cell power systems.

2. Description

Solid Oxide Fuel Cells (SOFCs) are a type of electrochemical device that convert chemical energy directly into electrical energy through the oxidation of fuel, such as hydrogen or hydrocarbons, and the reduction of oxygen. SOFCs consist of three main components: an anode, a cathode, and a solid electrolyte. At high operating temperatures typically above 800° C., oxygen ions from the cathode migrate through the solid oxide conducting electrolyte to the anode, where they react with fuel, generating electrons. These electrons flow through an external circuit, producing electrical power. SOFCs offer high energy conversion efficiency, fuel flexibility, and low emissions, making them promising candidates for clean and efficient electricity generation in a wide range of applications, including stationary power generation, portable devices, and transportation.

Conventional energy generation methods, such as combustion-based power plants, pose significant challenges in terms of efficiency, environmental impact, and emissions of greenhouse gases. The need for clean and sustainable energy sources has led to the development of alternative technologies like SOFCs. However, the widespread adoption of SOFCs has been hindered by several challenges.

One of the key challenges in SOFC technology is the high operating temperature required for efficient operation. Traditional SOFCs often operate at temperatures exceeding 800° C., limiting their practicality and increasing material degradation rates. Additionally, the emissions associated with the utilization of conventional fuels in SOFCs, such as hydrocarbons, remain a concern and need to be addressed.

Numerous efforts have been made in the prior art to address the challenges of high operating temperatures and emissions in SOFCs. Various advancements, such as the use of novel materials, improved cell designs, and optimized manufacturing processes, have been proposed and implemented. Additionally, the integration of fuel reforming techniques and the utilization of alternative fuel sources have been explored to mitigate emissions. However, these existing solutions have their own limitations, including complex fabrication methods, high costs, and limited efficiency gains.

Prior art SOFCs achieve fast start-up using an external combustor as a preheater and/or leverage exhaust gas heat using heat exchangers.

SOFCs generally require the use of bulky preheaters and/or heat exchangers generally used to warm the SOFC to an ideal operating temperature and provide rapid start-up. The problem with these preheaters and heat exchangers are they are heavy, relatively large, and costly. The arrangement of a pre-burners, after-burner, and/or heat exchangers for SOFC system has been well established in the field and most optimizations are focused on the efficiency and control of burner itself.

BRIEF SUMMARY

In view of at least some of the above-referenced problems in conventional SOFC implementations, an exemplary object of the present disclosure may be to provide a new integrated SOFC combustor (SOFC-C) assembly, system, and method for producing electrical power. An exemplary such SOFC-C assembly may desirably feature quick heating of the fuel cell stack by combustion of residue fuel to operational levels without using bulky preheaters and/or heat exchangers, thus saving weight, room, and cost. For example, the assembly may take advantage of the temperature rise during compression and the combustion of anode off-gas, via an integrated combustion chamber to eliminate the recuperating heat exchanger usually required for cathode flows, thus greatly reducing the size and weight (thermal mass) of the system. The integrated SOFC-C assembly may enable improved hybrid power generation systems, without the common issues of conventional SOFCs, for commercial applications, thus greatly improving the prospect of SOFC utilization in vehicle energy utilization markets where high efficiency, lightweight and low emission to zero emissions are sought with more cost tolerance of the power systems.

The exemplary such SOFC-C assembly may desirably feature a turbogenerator (TG) will provide a very high fuel-to-electricity conversion efficiency while maintaining high power-to-weight ratio during high-altitude flight. This unique assembly addresses many of the challenges faced in all electric propulsion-based aviation. The system has high part-load efficiency (more than 65% lower heating value (LHV)) during long cruise times, load following capability, high-power capacity at high altitudes adapting to low temperatures and pressures, rapid startup time of less than 30 minutes, high power density (more than 3.6 kW/kg), efficient thermal management, and a foundation for a compact, efficient electrical storage and power generation (ESPG) system. The SOFC-C may achieve the technology targets by reducing the complexity of traditional fuel cell-gas turbine hybrid systems (FC-GT). The SOFC-C may not require heat exchangers and dramatically reduces the balance of plant increasing power density and performance in efficiency. The reduction in mass through elimination of heat exchangers, external reformer, and other components dramatically decreases the overall thermal dampening of the system which enables rapid startup and load following capability. Direct control of the cathode inlet temperature of the SOFC-C may enable rapid warm-up of the SOFC tubes with the ability to reach operating temperature and full power in less than 30 minutes.

The operation of the SOFC-C with turbogenerator (TG) to meet power demands on the aircraft or other vehicle during vastly changing operation environments may be achieved with only four inputs to the system: (1) fuel control valve to maintain desired fuel utilization and cathode inlet temperature, (2) TG generator load to maintain desired shaft speed and air mass flow, (3) SOFC load for maintaining total power (SOFC-C and TG power) produced by SOFC-C-TG, and (4) post combustor fuel flow to increase turbine inlet temperature and TG power during high power events such as take-off. Large high temperature valves for cathode bypass or bleed, additional combustors/fuel valves, and cathode injectors or high temperature blowers may not be required for the SOFC-C-TG system.

The SOFC technology may feature a high-power density, low weight tubular SOFC architecture. This technology may be well suited for aerospace applications to reduce system size, weight, complexity, startup time, and cost. The SOFC technology provides the base technology to push the performance limits of power densities more than 3.6 kW/kg. Additionally, the exemplary SOFC-C assembly may feature bio-LNG as an ideal fuel for the SOFC-C and electric aircraft. The advantages of using bio-LNG with the SOFC-C assembly include chemical compatibility for direct internal reforming preventing stack poisoning and coking, thermal recuperation by using waste heat for steam reformation to produce higher heating value hydrogen, thermal management of the stack via direct steam reformation without additional water supply, and rapid load response by eliminating the required pretreatment and processing of the fuel. Bio-LNG also has benefits for thermal management on the aircraft for electrical components and cabin.

The SOFC-C assembly is innovative while building on current state of the art modular SOFC technology. The simplicity and modularity of the SOFC-C provides an assembly that is a game changer and transformative for the aerospace industry. The assembly can also be scaled down for smaller aircraft without sacrificing performance due to the modularity of the SOFC tubes and combustor assembly without large cathode heat exchangers.

An exemplary such assembly may further feature placement of internal burner in between anode outlet and cathode inlet not only allows better temperature control and heat transfer but also provides management capability to reduce toxic compounds such as NOx in post-cell emission gas.

An exemplary such assembly may further feature direct control of the cathode inlet temperature via the direct combustion of the anode off-gas prior to entering the cathode and by manipulating the fuel flow.

An exemplary such assembly provides an innovative solution with a high power density, and direct control of the SOFC temperature during changing loads and altitudes without adding thermal mass. The assembly was initially explored for high-power density and high fuel-to-electric efficiency (>65% during cruise) with rapid startup and load following capability (>30% load change), but it also enables direct removal of certain post-combustion pollutants such as NOx inside cathode chamber down to ppm level via electrochemical reduction/decomposition/denitrification before the emission gas releases as exhaust, and hence avoids the environmental impact issue common with traditional flue gas combustion.

The exemplary such assembly may further feature rapid startup (e.g., less than 30 minutes) to full power via its direct control of the cathode inlet temperature, thus enabling rapid warmup of the SOFC tubes during startup cycles in the field.

The exemplary such assembly may further provide configurational innovation that facilitates realization of control strategy of hybrid SOFC systems for rapid load following (e.g., greater than 30% step change in load) that is critical for mobile and aviation applications.

The exemplary such assembly may further feature a design reconfiguration that utilizes the cathode as a dual reactor for both oxygen reduction and catalytic decomposition of nitric oxides and carbon monoxide in post-combustion cathode reactant, thus effectively reducing the emission of exhaust gas without need of an external off-gas processor or recirculation of external burner products as suggested in prior art.

The exemplary such assembly may further feature a design reconfiguration that utilizes the combustor as a dual reactor for residue fuel in the anode off-gas and contaminants in the compressed air source such as traces of fuel, nitric oxides, ammonia, hydrocarbons, and hydrogen, providing a method of processing and cleaning contaminated air. Examples of contaminated air are nitric oxides, ammonia and methane in gases released in water treatment plant. These trace contaminants are typically released in the environment with negative impact. The precombustor oxidizes these trace contaminates, thus providing inert exhaust with lower environmental impact.

In a particular embodiment, an exemplary integrated SOFC combustor assembly as disclosed herein may include a plenum housing, one or more SOFC tubes or stacks are positioned within the plenum housing, and a combustion chamber positioned within the plenum housing. The one or more SOFC tube or stacks may have a first end, a second end, an inner surface defining an anode, and an outer surface defining a cathode. The one or more SOFC tubes may be configured to receive fuel from a fuel source at the first end and oxidize the majority of the fuel into with remaining unoxidized off-gas to be expelled from the second end. The combustion chamber may be disposed within the plenum housing proximate the second end of the one or more SOFC tubes. The combustion chamber may be configured to mix compressed air with the off-gas from the one or more SOFC tubes or stacks and combust the compressed air and the off-gas into combustion products. The plenum housing may be configured to direct the combustion products from the second end to the first end along the outer surface.

In an exemplary aspect according to the above-referenced embodiment, the cathode may be configured to reduce or remove post-combustion pollutants from the combustion products prior to expulsion from the plenum housing.

In an exemplary aspect according to the above-referenced embodiment, the integrated SOFC combustor assembly may further include fuel processing and desulfurizer placed within, in conjunction with, adjacent, before, or after the precombustor that uses anode off-gas. The fuel processing and desulfurizer may enable thermal management of the fuel processing system that desulfurizes and performs pre-reforming of liquid and kerosene-based fuels by adding heat from the precombustion or post combustion process. The precombustor may give precise control of both the fuel processor and cathode inlet, while a post combustor may give precise control of both the fuel processor and turbine inlet.

In another exemplary aspect according to the above-referenced embodiment, the integrated SOFC combustor assembly may further include an off-gas flow distributor disposed between the second end of the one or more SOFC tubes and the combustion chamber. The off-gas flow distributor may be configured to uniformly distribute flow of the off-gas into the combustion chamber.

In another exemplary aspect according to the above-referenced embodiment, the off-gas flow distributor may be configured to recirculate at least a portion of the off-gas from the second end to the first end of the one or more SOFC tubes via a recirculating pathway.

In another exemplary aspect according to the above-referenced embodiment, the integrated SOFC combustor assembly may further include a compressed air source and a compressed airflow distributor disposed between the compressed air source and the combustion chamber. The compressed airflow distributor may be configured to uniformly distribute flow of the compressed air into the combustion chamber.

In another exemplary aspect according to the above-referenced embodiment, the compressed air may be at a temperature between about -40 degrees Celsius (233K) to about 600 degrees Celsius.

In another exemplary aspect according to the above-referenced embodiment, the compressed air may be at a pressure between about 20 kPa to 5000 kPa.

In another exemplary aspect according to the above-referenced embodiment, the integrated SOFC combustor assembly may further include an output coupled between the anode and the cathode of the one or more SOFC tubes or stacks. The output may be configured to supply direct current (DC) power.

In another exemplary aspect according to the above-referenced embodiment, the compressed air may include a stoichiometric excess of oxygen ($O_2$).

In another exemplary aspect according to the above-referenced embodiment, the integrated SOFC combustor assembly may further include a controller configured to control a temperature of the cathode by adjusting an amount of the fuel received by the first end of the one or more SOFC tubes or stacks.

In another exemplary aspect according to the above-referenced embodiment, a temperature of the combustion chamber may be between about 500 degrees Celsius and about 800 degrees Celsius.

In another exemplary aspect according to the above-referenced embodiment, the integrated SOFC combustor assembly may further include a fuel manifold positioned between the fuel source and the first end of the one or more SOFC tubes.

In another exemplary aspect according to the above-referenced embodiment, the one or more SOFC tubes may comprise a plurality of SOFC tubes positioned within the plenum housing. In accordance with this embodiment, the fuel manifold may be configured to uniformly distribute flow of the fuel into each of the plurality of SOFC tubes.

In another embodiment, an exemplary method of producing electrical power may include (a) providing an integrated solid oxide fuel cell (SOFC) combustor including at least one SOFC tube or stacks and a combustion chamber positioned within a plenum housing; (b) directing fuel along an anode of the at least one SOFC tube or stacks and into one or more of the combustion chamber or a bypass pathway; (c) combusting the directed fuel with compressed air to produce combustion products; and (d) directing the combustion products along a cathode of the at least one SOFC tube and out of the plenum housing as exhaust gases.

In an exemplary aspect according to the above-referenced embodiment, step (b) may further include controlling an amount of fuel directed along the anode to control a temperature of the cathode of the at least one SOFC tube.

In another exemplary aspect according to the above-referenced embodiment, step (d) may further include generating direct current (DC) power from the at least one SOFC tube.

In another exemplary aspect according to the above-referenced embodiment, step (b) may further include selectively directing a portion of the fuel exiting the anode back to the anode via the bypass pathway.

In another exemplary aspect according to the above-referenced embodiment, step (b) may further include controlling an amount of the fuel directed to a post combustor to control a temperature of a turbine in a turbogenerator and a pre-reformer and desulfurizer.

In another exemplary aspect according to the above-referenced embodiment, step (b) may further include controlling an amount of the fuel directed along the anode to control a temperature of the cathode of the at least one SOFC tube and a pre-reformer and desulfurizer.

In another embodiment, an exemplary electric storage and power generation system may include a fuel source, a solid oxide fuel cell (SOFC) combustor assembly, a power management system, a turbogenerator, and an electric drive system for propulsion. The SOFC combustor assembly may include a plenum housing, one or more SOFC tubes positioned within the plenum housing, and a combustion chamber disposed within the plenum housing. The power management system may be configured to receive energy from the SOFC combustor assembly. The turbogenerator may be coupled to the fuel source and configured to receive exhaust gases from the SOFC combustor assembly. The electric drive system may be coupled to the power management system. The turbogenerator, the power management system, and the electric drive system may be cooled by the fuel source.

In an exemplary aspect according to the above-referenced embodiment, the electric storage and power generation system may further include a controller configured to control an amount of fuel from the fuel source directed along an anode of the one or more SOFC tubes to control a temperature of a cathode of the one or more SOFC tubes. The controller may further be configured to monitor and control a temperature of each of the turbogenerator, the power management system, and the electric drive system using the fuel source.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
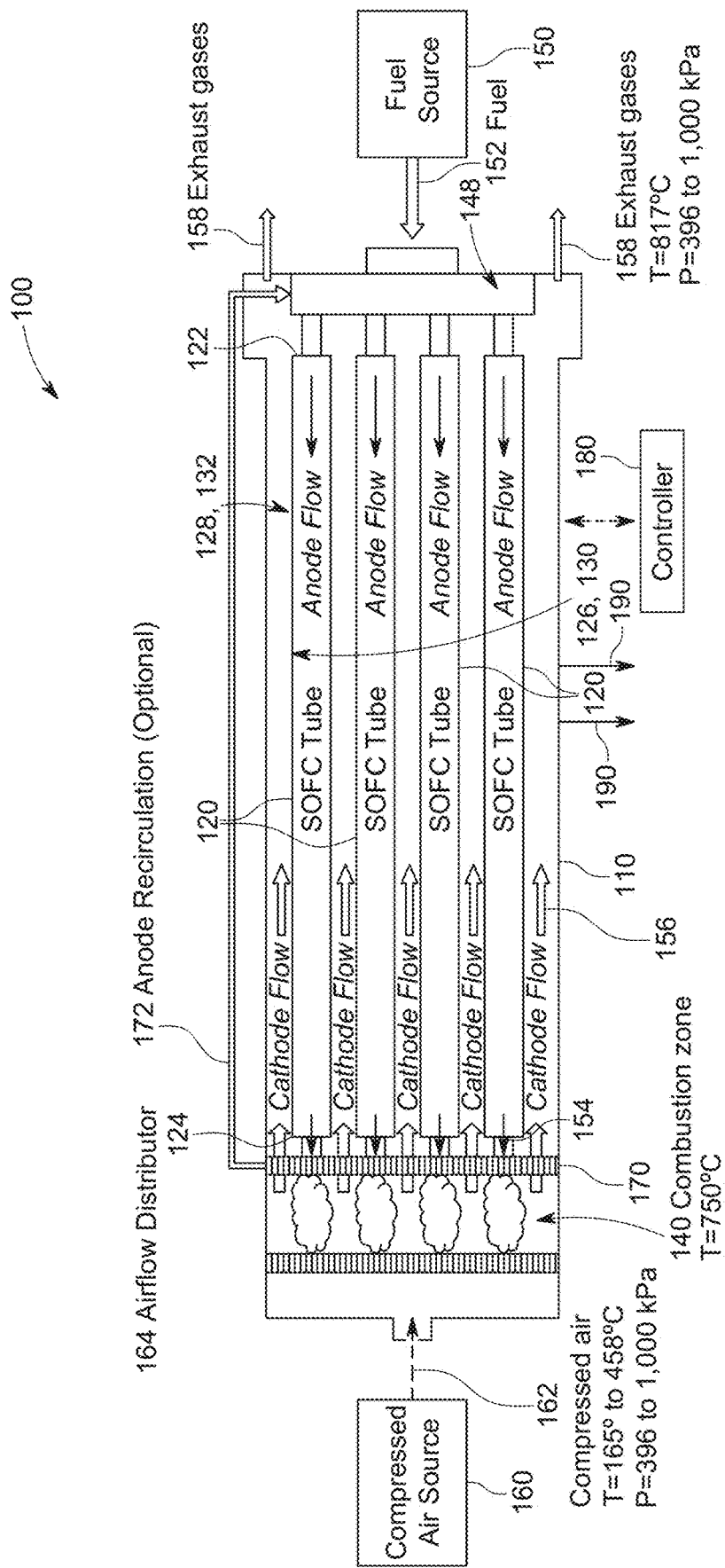
FIG. 1 is a diagram of an embodiment of an integrated SOFC combustor assembly in accordance with the present disclosure.

Referring to FIG. 1, an integrated solid oxide fuel cell (SOFC) combustor assembly 100 is illustrated. The integrated SOFC combustor assembly 100 may also be referred to herein as an SOFC-C assembly 100 or an SOFC-C 100. The integrated SOFC combustor assembly 100 may include a plenum housing 110, one or more SOFC tubes 120, and a combustion chamber 140. Each of the one or more SOFC tubes 120 and the combustion chamber 140 may be positioned within the plenum housing 110. The plenum housing 110 may also be referred to herein as a housing 110. The one or more SOFC tubes 120 may also be referred to as at least one SOFC tube 120, a plurality of SOFC tubes 120, a stack of SOFC tubes 120, or a stack 120. In certain optional embodiments, the integrated SOFC combustor assembly 100 may include multiple combustion chambers (not shown), one associated with each of the one or more SOFC tubes 120 or a grouping of the SOFC tubes. As such, the integrated SOFC combustor assembly 100 may include a plurality of SOFC tubes positioned within the plenum housing 110.

The integrated SOFC combustor assembly 100 design addresses many challenges for fuel cell-gas turbine hybrid systems as potential high-power density low emission electric propulsion in aerospace applications. The integrated SOFC combustor assembly 100 may provide companies actively seeking new highly efficient technologies that can utilize renewable energy sources with little carbon foot print an elegant solution for electrification of vehicles such as large commercial aircraft, heavy truck and LNG vessels. The integrated SOFC combustor assembly 100 may be useful in markets that require lightweight, fast start-up and high power density. Further, the integrated SOFC combustor assembly 100 may be scalable from a few kWs (e.g., small UAV, tele-commutation tower backup power, auxiliary power system, etc.) to hundreds of kWs (e.g., large UAV, semi-truck, commercial building, auxiliary power system, etc.) to MWs (e.g., heavy truck, electric aircraft, LNG vessel, maritime vessel, etc.). The integrated SOFC combustor assembly 100 may also be highly useful in certain products, such as, a range extender for UAVs, EVs or Trucks, a back-up power generator for commercial/residential buildings, APU for aircrafts and ships as well as a propulsion system for next-generation electric aircrafts. The integrated SOFC combustor assembly 100 may also be highly useful in certain products, such as, emission mitigation and power generation systems for wastewater treatment plants, industrial processes which produce low level pollutants in air streams that can be oxidized to safe environmentally inert state for safe release. i.e. wastewater treatment plants produce diluted ammonia nitrous oxides during a nitration process in the open air which is too diluted to economically capture. The integrated SOFC combustor assembly can utilize the captured air with diluted ammonia and nitrous oxides and oxidize the ammonia in the combustor region before it enters the cathode and denitrification of the nitrous oxides in the cathode process stream.

Each of the one or more SOFC tubes 120 may include a first end 122, a second end 124, an inner surface 126, and an outer surface 128. The inner surface 126 may define an anode 130 of the one or more SOFC tubes 120. The outer surface 128 may define a cathode 132 of the one or more SOFC tubes 120. The one or more SOFC tubes 120 may be configured to receive fuel 152 (e.g., a hydrogen rich gas) from a fuel source 150 at the first end 122 and electrochemically react (e.g., oxidize) into an off-gas 154 to be expelled from the second end 124. The off-gas 154 may also be referred to as an anode off-gas 154.

The fuel 152 may be hydrogen (H2), which is often considered the ideal fuel for SOFCs due to its high reactivity and clean combustion, resulting in water vapor as the only byproduct. Additionally, SOFCs can directly use hydrocarbons such as jet fuels, kerosene based fuels, methane (CH4), propane (C3H8), and butane (C4H10) as fuel sources, which are readily available and widely used. Bio Liquified Natural Gas (Bio LNG), produced from renewable sources such as organic waste or agricultural byproducts, can also be used as a fuel in SOFCs. This renewable fuel option contributes to the environmental sustainability of SOFCs, as it reduces greenhouse gas emissions and offers a carbon-neutral energy solution. The fuel flexibility of SOFCs, including the utilization of bio LNG and sustainable aviation fuel, makes them suitable for various applications, offering the potential to leverage diverse fuel sources and address energy needs in different settings. Ammonia and hydrocarbons without sulfur may also be used as the fuel source.

The integrated SOFC combustor assembly 100 may further include a fuel processing and desulfurizer may be placed within, in conjunction with, adjacent, before, or after the precombustor (e.g., the off-gas flow distributor 170) that uses anode off-gas 154, or after the SOFC combustor assembly 100 using a post combustor 316 (see FIG. 4) for thermal control. By integrating the fuel processing and desulfurizer, the integrated SOFC combustor assembly 100 may be compatible additional fuel-types 152 such as kerosene, liquid and jet fuels. The fuel processing and desulfurizer may also be referred to herein as a pre-reformer and desulfurizer. The fuel processing and desulfurizer may enable thermal management of the fuel processing system that desulfurizes and performs pre-reforming of liquid and kerosene-based fuels by adding heat from the precombustion or post combustion process. The precombustor may give precise control of both the fuel processor and cathode inlet, while the post combustor 316 may provide precise control of the turbine inlet temperature and pre-reformer and desulfurizer. The integration allows proximity of hot fuel processing to the fuel cell which reduces heat loss, pressure loss, and control lag.

The combustion chamber 140 may be positioned within the plenum housing 110 proximate to the second end 124 of the one or more SOFC tubes 120. The combustion chamber may be configured to mix compressed air 162 with the off-gas 154 from the one or more SOFC tubes 120 and combust a mixture of the compressed air 162 and the off-gas 154 into a combustion product 156. The combustion product 156 includes plenty of residual oxygen (~19% mol fraction). A temperature of the combustion chamber 140 may be between about 600 degrees Celsius and about 800 degrees Celsius.

Figure 2A:
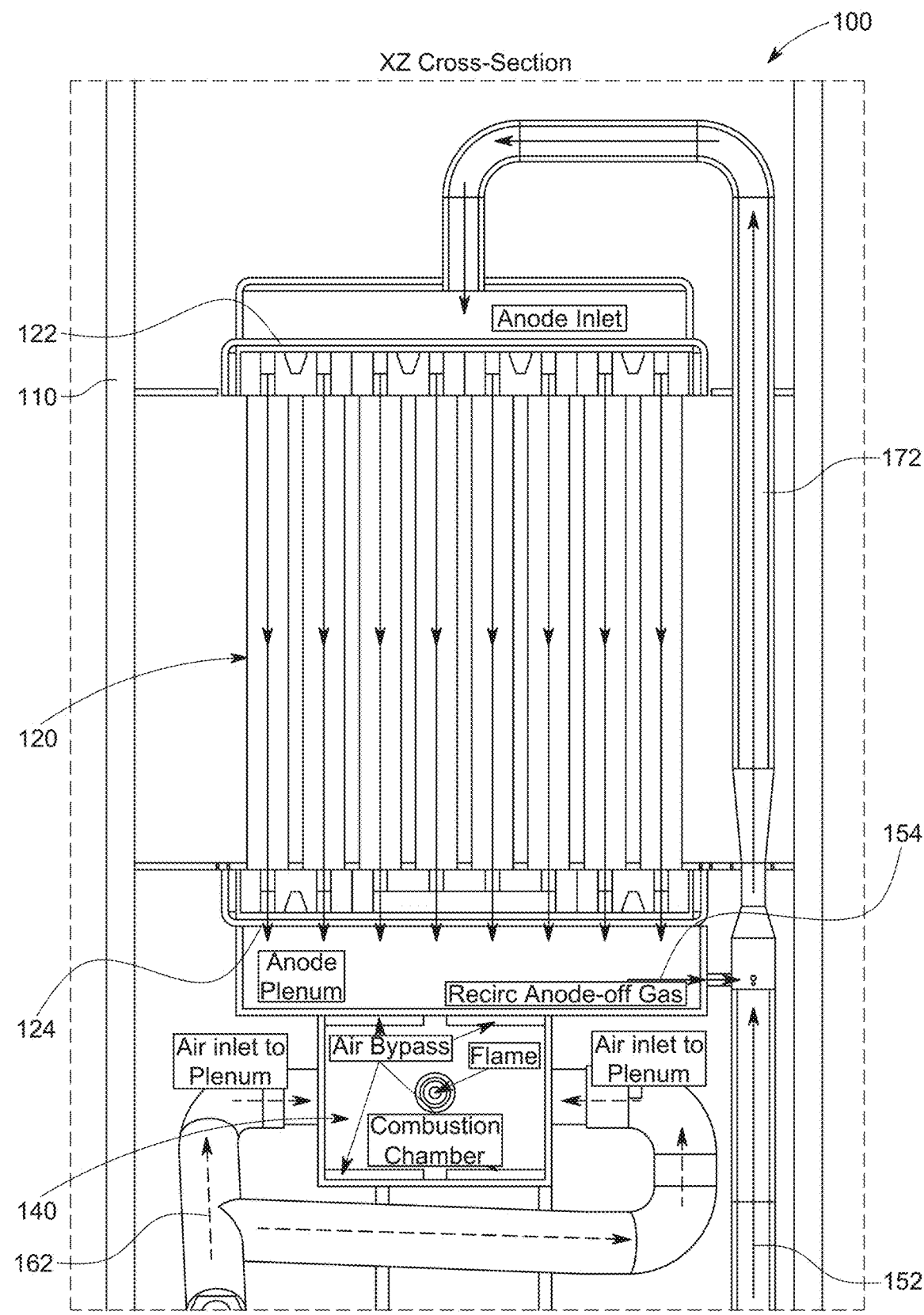
FIG. 2A is an XZ cross-sectional diagram of an embodiment of an integrated SOFC combustor assembly in accordance with the present disclosure.
Figure 2B:
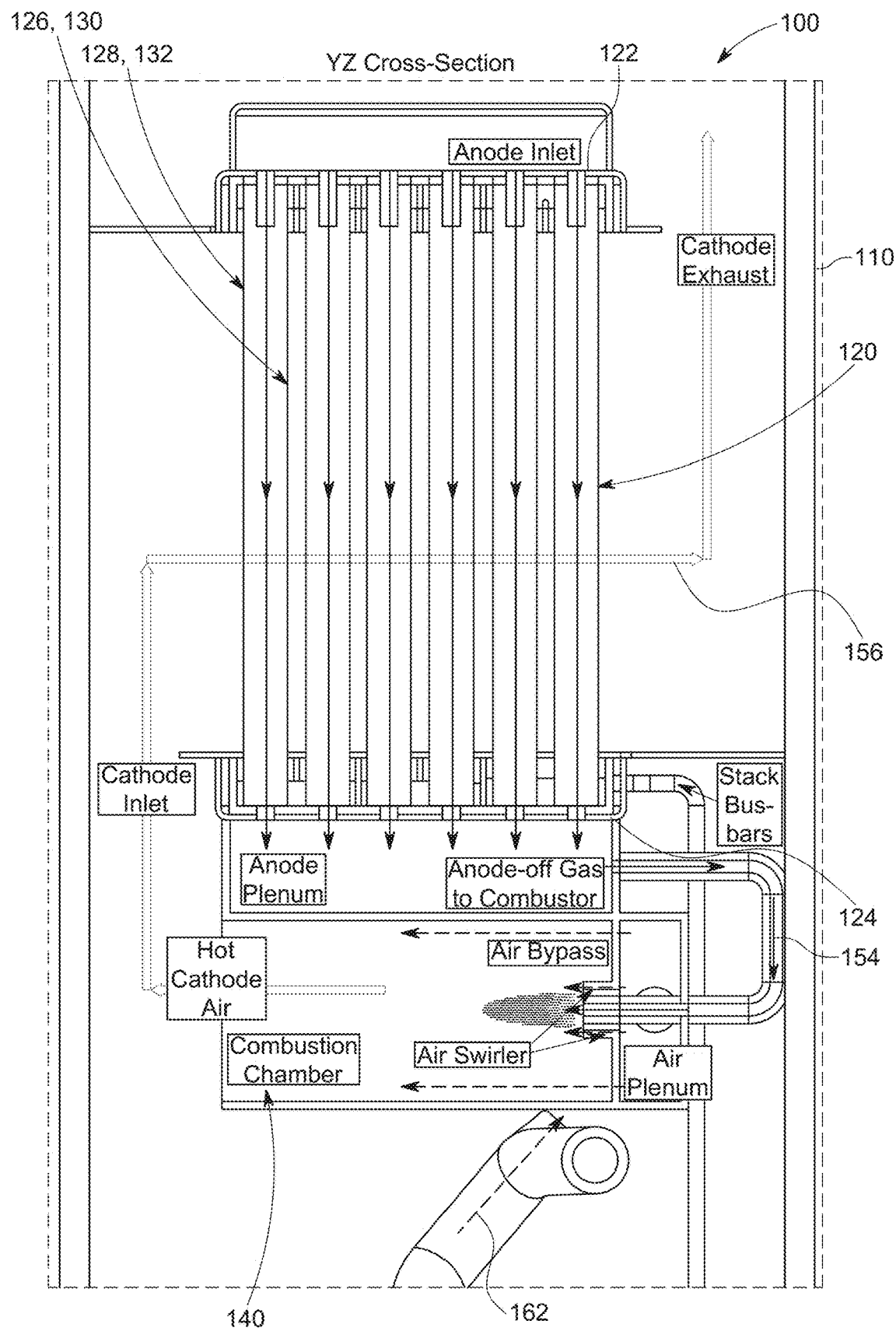
FIG. 2B is an YZ cross-sectional diagram of an embodiment of an integrated SOFC combustor assembly in accordance with the present disclosure.

The plenum housing 110 may be configured to direct the combustion product 156 from the first end 122 to the second end 124 along the outer surface 128, for example, as shown in FIG. 2B. The combustion product 156 may provide the oxidant for the electrochemical reactions with the cathode 132. The cathode 132 may be configured to reduce or remove post-combustion pollutants from the combustion product 156 as the combustion product 156 travels from the first end 122 to the second end 124 prior to expulsion from the plenum housing 110 as exhaust 158. In certain optional embodiments, an in-line catalyst for catalytic partial oxidation (CPOX) of hydrocarbon fuels may be included.

The integrated SOFC combustor assembly 100 may provide direct current (DC) power at an output 190 when fuel 152 is provided through fuel passageway (e.g., the anode 130) and an oxidizing gas (e.g., the combustion product 156) is provided through the exit passageway (e.g., the cathode 132). The output 190 (e.g., DC power) may be used to power electrical components, such as, for example electric motors, computers, electrical systems, and the like. In certain optional embodiments, the integrated SOFC combustor assembly 100 may further include an inverter coupled to the output 190 to provide alternating current (AC) power output to electrical systems, such as those of an aircraft.

The compressed air 162 may be supplied from a compressed air source 160, such as, for example, a compressor or blower. The compressed air 162 may include a stoichiometric excess of oxygen ($O_2$). In certain optional embodiments, the integrated SOFC combustor assembly 100 may further include a compressed airflow distributor 164 disposed within the plenum housing 110 between the compressed air source 160 and the combustion chamber 140.

The compressed airflow distributor 164 may be configured to uniformly distribute flow of the compressed air 162 into the combustion chamber 140. The compressed air 162 may be at a temperature of between about −40 degrees Celsius and about 550 degrees Celsius, for example, during operation of an aircraft between 1,000 ft to 40,000 ft and 50-100% load. The compressed air 162 may be at a pressure of between about 20 kPa and about 5000 kPa. Any source of air may be used directly at any pressure as long as there is enough pressure to overcome the pressure losses in the SOFC-C system. Any temperature for the air supply is acceptable as long as it is below the operation temperature of the SOFC. Air sources may be from engine bleeds, air scoops, blowers, exhaust streams, compressors, or stored tank air (oxidant: nitrous oxides, liquid oxygen, etc.). If the temperature of the air source it greater than the operating temperature of the SOFC, then the air stream may be cooled via the fuel such as LNG and through heat rejection via heat exchange with an endothermic reaction of the fuel such as steam reforming. An example would be for a hypersonic vehicle operating higher than Mach 5 would have an air source ~1000 C, which would be cooled to ~800 C by the fuel and endothermic reaction of the fuel, absorbing heat from the air stream.

In certain optional embodiments, the integrated SOFC combustor assembly 100 may further include a fuel manifold 148 positioned between the fuel source 150 and the first end 122 of the one or more SOFC tubes 120. The fuel manifold 148 may be configured to uniformly distribute flow of the fuel 152 into each of the one or more SOFC tubes 120. The fuel 152 is at least partially reformed in the fuel manifold 148. In certain optional embodiments, the fuel may be reformed partially or in whole externally in the anode recycle loop or internally directly on the anode electrode surface. In other optional embodiments, the fuel may be reformed partially or in whole externally removing heat from the incoming air stream to cool the air stream. More exotic fuels such as hydrazine may be used which will be decomposed to nitrogen and ammonia in catalytic reactors prior to the entering the SOFC anode assembly.

In certain optional embodiments, the integrated SOFC combustor assembly 100 may further include an off-gas flow distributor 170 disposed within the plenum housing 110. The off-gas flow distributor 170 may be disposed between the second end 124 of the one or more SOFC tubes 120 and the combustion chamber 140. The off-gas flow distributor 170 may be configured to uniformly distribute flow of the off-gas 154 into the combustion chamber 140. In other optional embodiments, the off-gas flow distributor 170 may be configured to recirculate at least a portion of the off-gas 154 from the second end 124 to the first end 122 of the one or more SOFC tubes 120 via a recirculating pathway 172, as illustrated in FIGS. 1 and 2A. The recirculating pathway 172 may provide steam to the incoming fuel for steam reformation. Alternatively, the off-gas flow distributor 170 may include an ejector configured to selectively redirect at least a portion of the off-gas 154 for recirculation from the second end 124 to the fuel manifold 148 via the recirculating pathway 172. Recirculating the fuel provides SOFC operating temperature control. The recirculation provides a more uniform operating temperature of the SOFC tube material along the length of the tube, thus boosting performance through reduction of electrochemical losses sensitive to temperature distribution. The off-gas distributor primary function is to promote complete combustion of any unoxidized fuel and provide uniform temperature of the combustor exit/cathode inlet. The objective is to have complete combustion with uniform flow and temperature of the cathode flow at 156 among the tubes or stacks.

In certain optional embodiments, the integrated SOFC combustor assembly 100 may further include a controller 180. The controller 180 may be configured to adjust a flow rate of the fuel 152 (e.g., fuel utilization set point) to thereby provide precise control of the cathode inlet temperature. The incoming air temperature is unknown and always potentially changing. The fuel flow which is traditionally used to maintain fuel utilization set points, the ratio of SOFC fuel electrochemical consumed to fuel supplied to system, during operation. In the SOFC-C, the fuel utilization is adjusted to control the cathode inlet temperature. By adjusting the fuel utilization set point, the amount of unreacted fuel, anode off-gas, is augmented to provide the chemical energy needed to achieve the desired operating temperature of the cathode inlet temperature thru combustion/oxidation. The controller 180 may utilize various sensors and systems to control the operational parameters of these elements.

The one or more SOFC tubes 120 may be encased in a combustion plenum for thermal management. In certain optional embodiments, the plenum housing 110 may be defined by a gas turbine combustor casing (e.g., hot box). The combustion plenum may change shape and layout depending on application. The location and proximity of the combustion plenum is determined based on meeting the uniform temperature and flow of the cathode flow and direction of heat losses through heat transfer from the combustion plenum to the system. For example, the combustion plenum may be located within the SOFC tubes for reducing heat losses to the environment (reduction of insulation). The combustor plenum may be placed, in some cases, on the adjacent side or surroundings to provide desired heat transfer to the SOFC tube or stack assembly for thermal management. In some applications, heat is insulated for desired operation and other applications heat is transferred out for thermal management (hypersonic vehicle).

The point of mixing the anode off-gas 154 and incoming air flow 162 may have design features to promote swirl, thorough mixing and desired distribution of gases for complete combustion, desired isothermal distribution, and equal flow distribution, for example, using the off-gas flow distributor 170.

Figure 3:
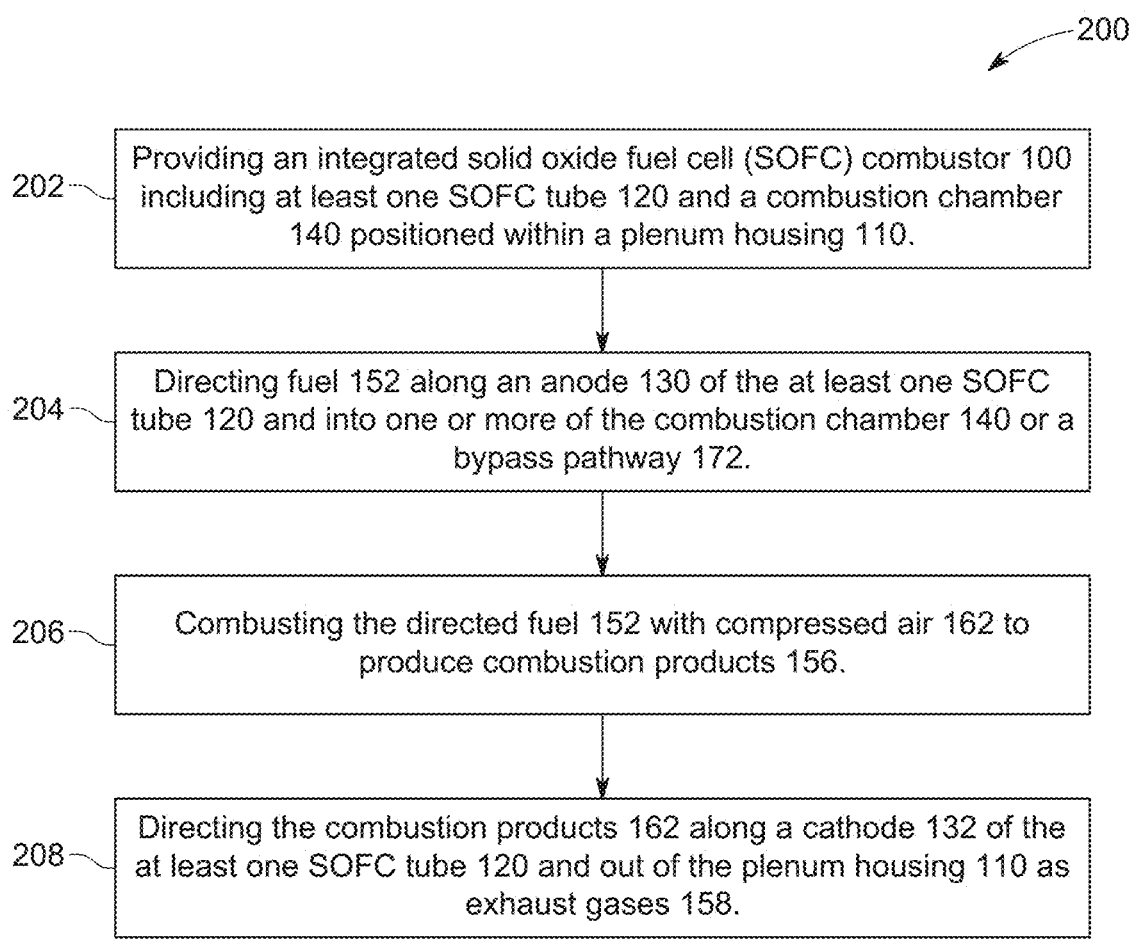
FIG. 3 is a flowchart of a method of producing electrical power using the integrated SOFC combustor assembly of FIG. 1 in accordance with the present disclosure.

Referring to FIG. 3, a method 200 of producing electrical power is provided. The method 200 may include providing 202 an integrated solid oxide fuel cell (SOFC) combustor 100 including at least one SOFC tube 120 and a combustion chamber 140 positioned within a plenum housing 110.

The method 200 may further include directing 204 fuel 152 along an anode 130 of the at least one SOFC tube 120 and into one or more of the combustion chamber 140 or a bypass pathway 172.

The method 200 may further include combusting 206 the directed fuel 152 with compressed air 162 to produce combustion products 156.

The method 200 may further include directing 208 the combustion products 156 along a cathode 132 of the at least one SOFC tube 120 and out of the plenum housing 110 as exhaust gases 158.

The method 200 may include additional method steps based upon the disclosure contained herein.

Figure 4:
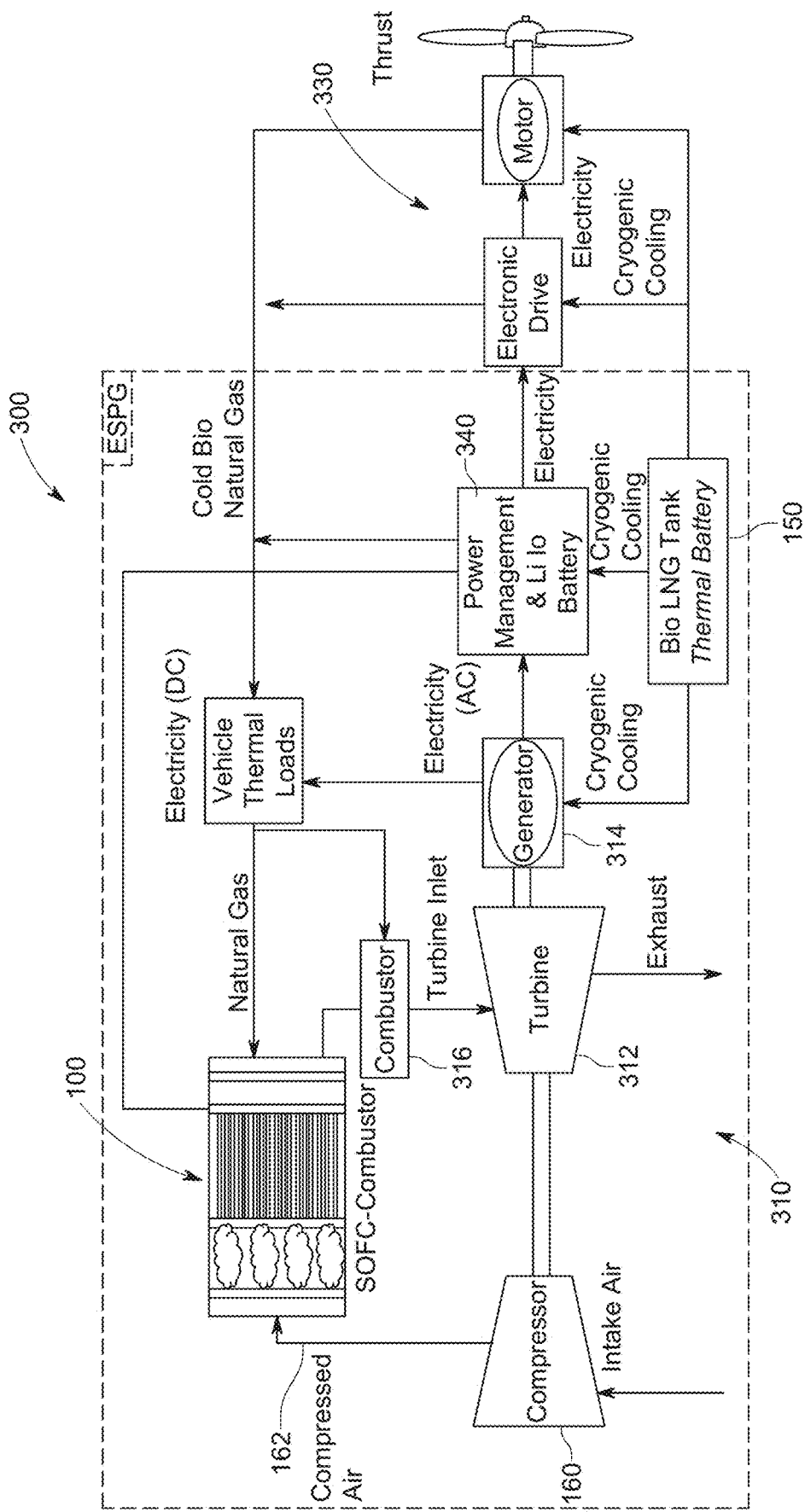
FIG. 4 is a diagram of an embodiment of an electric storage and power generation (ESPG) system in accordance with the present disclosure.

Referring to FIG. 4, an electric storage and power generation (ESPG) system 300 is provided. The ESPG system 300 may leverage the SOFC combustor 100 an overall energy optimized electric aircraft or the like vehicle. The ESPG system 300 may include the SOFC combustor assembly 100, a turbogenerator 310, a fuel source 150 (discussed above), and an electric drive system 330 for propulsion to define an integrated propulsion, power and thermal management system (IPPTS).

The fuel source 150 provides electrical power and cryogenic thermal management for the generator 314 and electric drive system 330. The illustrated pressures and temperatures of each element are shown for the system operating during (8.8 MW before power conditioning) at 35,000 ft and Mach 0.8. The ESPG system 300 provides a high efficiency, low environmental impact, and economic solution for electric aircrafts or the like vehicles. The fuel source 150 may be self-pressurizing in the storage tank with the appropriate thermal input, which may eliminate the need for fuel pumps.

As illustrated in FIG. 4, the compressed air source 160 may be a compressor directly coupled to a turbine 312 which is in turn coupled to a high power density electric generator 314 to define the turbogenerator 310. The exhaust gases 158 from the SOFC combustor assembly 100 may be fed to a post combustor 316 (optional) of the turbogenerator 310. The output 190 (e.g., DC power) from the SOFC combustor assembly 100 and an output (e.g., AC power) from the high power density electric generator 314 may be fed to a power management system 340.

The ESPG system 300 may leverage the fuel source 150 chemically and thermally. The fuel source may be utilized to provide cryogenic cooling to each of the electric generator 314, the electric drive system 330, and the power management system 340.

The term "controller" or equivalents thereof as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. An integrated solid oxide fuel cell (SOFC) combustor assembly, the assembly comprising:
    a plenum housing;
    one or more SOFC tubes positioned within the plenum housing, the one or more SOFC tubes having a first end, a second end, an inner surface defining an anode, and an outer surface defining a cathode, the inner surface of the one or more SOFC tubes configured to receive fuel from a fuel source at the first end and off-gas the fuel from the second end defining an off-gas;
    a combustion chamber disposed within the plenum housing proximate the second end of the one or more SOFC tubes, the combustion chamber configured to mix compressed air with the off-gas and combust the compressed air and the off-gas into combustion products;
    a compressed air source; and
    a compressed airflow distributor disposed between the compressed air source and the combustion chamber opposite from the second end of the one or more SOFC tubes, the compressed airflow distributor configured to uniformly distribute flow of the compressed air from the compressed air source directly into the combustion chamber to be mixed with the off-gas from the second end of the one or more SOFC tubes,
    wherein the plenum housing is configured to direct the combustion products from the second end of the one or more SOFC tubes to the first end of the one or more SOFC tubes along the outer surface of the one or more SOFC tubes before exhausting the combustion products.

2. The integrated SOFC assembly of claim 1, wherein:
    the cathode is configured to reduce or remove post-combustion pollutants from the combustion products prior to expulsion from the plenum housing.

3. The integrated SOFC assembly of claim 1, further comprising:
    an off-gas flow distributor disposed between the second end of the one or more SOFC tubes and the combustion chamber, the off-gas flow distributor configured to uniformly distribute flow of the off-gas into the combustion chamber.

4. The integrated SOFC assembly of claim 3, wherein:
    the off-gas flow distributor includes an ejector configured to selectively recirculate at least a portion of the off-gas from the second end to the first end of the one or more SOFC tubes via a recirculating pathway.

5. The integrated SOFC assembly of claim 4, further comprising:
    a controller configured to control the portion of the off-gas directed from the second end to the first end of the one or more SOFC tubes.

6. The integrated SOFC assembly of claim 1, further comprising:
    a compressed air source; and
    a compressed airflow distributor disposed between the compressed air source and the combustion chamber, the compressed airflow distributor configured to uniformly distribute flow of the compressed air into the combustion chamber.

7. The integrated SOFC assembly of claim 1, wherein:
    the compressed air is at a temperature between about 100 degrees Celsius and about 500 degrees Celsius.

8. The integrated SOFC assembly of claim 1, wherein:
    the compressed air is at a pressure between about 20 kPa and about 5000 kPa.

9. The integrated SOFC assembly of claim 1, further comprising:
    an output coupled between the anode and the cathode of the one or more SOFC tubes, the output configured to supply direct current (DC) power from the one or more SOFC tubes.

10. The integrated SOFC assembly of claim 1, wherein:
    the compressed air includes a stoichiometric excess of oxygen ($O_2$).

11. The integrated SOFC assembly of claim 1, further comprising:
    a controller configured to control a temperature of the cathode by adjusting an amount of the fuel received by the first end of the one or more SOFC tubes.

12. The integrated SOFC assembly of claim 1, wherein:
    a temperature of the combustion chamber during operation, and prior to the cathode, is between about 600 degrees Celsius and about 800 degrees Celsius.

13. The integrated SOFC assembly of claim 1, further comprises:
    a fuel manifold positioned between the fuel source and the first end of the one or more SOFC tubes.

14. The integrated SOFC assembly of claim 13, wherein:
    the one or more SOFC tubes comprises a plurality of SOFC tubes positioned within the plenum housing; and
    the fuel manifold is configured to uniformly distribute flow of the fuel into each of the plurality of SOFC tubes.

15. An integrated solid oxide fuel cell (SOFC) combustor assembly, the assembly comprising:
    a plenum housing;
    one or more SOFC tubes positioned within the plenum housing, the one or more SOFC tubes having a first end, a second end, an inner surface defining an anode, and an outer surface defining a cathode, the inner surface of the one or more SOFC tubes configured to receive fuel from a fuel source at the first end and off-gas the fuel from the second end defining an off-gas;

a combustion chamber disposed within the plenum housing proximate the second end of the one or more SOFC tubes, the combustion chamber configured to mix compressed air with the off-gas and combust the compressed air and the off-gas into combustion products;

a compressed air source; and a compressed airflow distributor disposed between the compressed air source and the combustion chamber, the compressed airflow distributor configured to uniformly distribute flow of the compressed air into the combustion chamber, wherein the plenum housing is configured to direct the combustion products from the second end of the one or more SOFC tubes to the first end of the one or more SOFC tubes along the outer surface of the one or more SOFC tubes to reduce or remove post-combustion pollutants from the combustion products prior to exhausting the combustion products.

16. The integrated SOFC assembly of claim 15, further comprising:

an off-gas flow distributor disposed between the second end of the one or more SOFC tubes and the combustion chamber, the off-gas flow distributor configured to uniformly distribute flow of the off-gas into the combustion chamber.

17. The integrated SOFC assembly of claim 16, wherein:

the off-gas flow distributor includes an ejector configured to selectively recirculate at least a portion of the off-gas from the second end to the first end of the one or more SOFC tubes via a recirculating pathway.

18. The integrated SOFC assembly of claim 17, further comprising:

a controller configured to control the portion of the off-gas directed from the second end to the first end of the one or more SOFC tubes.

19. The integrated SOFC assembly of claim 15, further comprising:

a controller configured to control a temperature of the cathode by adjusting an amount of the fuel received by the first end of the one or more SOFC tubes.

* * * * *

UNITED STATES PATENT AND TRADEMARK OFFICE
CERTIFICATE OF CORRECTION

| | | |
|---|---|---|
| PATENT NO. | : 12,308,491 B2 | Page 1 of 1 |
| APPLICATION NO. | : 18/743930 | |
| DATED | : May 20, 2025 | |
| INVENTOR(S) | : Rory Roberts | |

It is certified that error appears in the above-identified patent and that said Letters Patent is hereby corrected as shown below:

On the Title Page

The phrase "provisional application No. 63/528,358, filed on Jul. 22, 2023" in the Related U.S. Application Data section should be replaced with "provisional application No. 63/523,358, filed on June 26, 2023."

Signed and Sealed this
Third Day of February, 2026

John A. Squires
*Director of the United States Patent and Trademark Office*